US006249688B1

(12) United States Patent
Holshouser et al.

(10) Patent No.: US 6,249,688 B1
(45) Date of Patent: Jun. 19, 2001

(54) ANTENNA ELECTRICAL COUPLING CONFIGURATIONS

(75) Inventors: Howard E. Holshouser, Efland; Gerard J. Hayes, Wake Forest, both of NC (US)

(73) Assignee: Ericcson Inc., Research Triangle Park, NC (US)

( * ) Notice: Subject to any disclaimer, the term of this patent is extended or adjusted under 35 U.S.C. 154(b) by 0 days.

(21) Appl. No.: 09/217,049

(22) Filed: Dec. 21, 1998

(51) Int. Cl.$^{7}$ .......... H04B 1/38

(52) U.S. Cl. .......... 455/562; 455/19; 343/700 R; 343/715; 343/729

(58) Field of Search .......... 955/90, 562, 6.1, 955/13.3, 19; 343/700 R, 702, 725, 895, 896, 714, 715, 720, 723, 729

(56) References Cited

U.S. PATENT DOCUMENTS

| | | | |
|---|---|---|---|
| D. 318,050 | 7/1991 | Elbaz et al. | D14/138 |
| D. 347,221 | 5/1994 | Siddoway | D14/138 |
| D. 352,503 | 11/1994 | Nagele | D14/138 |
| D. 367,062 | 2/1996 | Tahmassebpur | D14/230 |
| D. 379,356 | 5/1997 | Liu et al. | D14/230 |
| D. 382,873 | 8/1997 | MacDonald, Jr. et al. | D14/138 |
| D. 398,611 | 9/1998 | Read | D14/230 |
| D. 407,716 | 4/1999 | Park | D14/138 |
| D. 421,017 | 2/2000 | Phipps | D14/230 |
| D. 421,402 | 3/2000 | Solenthaler | D10/104 |
| 4,121,218 | 10/1978 | Irwin et al. | 343/702 |
| 4,471,493 | 9/1984 | Schober | 455/90 |
| 4,992,799 | 2/1991 | Garay | 343/702 |
| 5,248,947 * | 9/1993 | Shiga | 331/44 |
| 5,260,998 * | 11/1993 | Takagi | 379/433 |
| 5,337,061 | 8/1994 | Pye et al. | 343/702 |
| 5,374,937 | 12/1994 | Tsunekawa et al. | 343/702 |
| 5,507,013 | 4/1996 | Weadon et al. | 455/90 |
| 5,572,223 * | 11/1996 | Phillips et al. | 343/702 |
| 5,583,519 | 12/1996 | Koike | 343/702 |
| 5,651,063 | 7/1997 | Ji et al. | 379/433 |

(List continued on next page.)

FOREIGN PATENT DOCUMENTS

| | | |
|---|---|---|
| 2191143A * | 6/1997 | (CA) . |
| 0415703A1 * | 3/1991 | (EP) . |
| 0 613 207 A1 | 2/1994 | (EP) . |
| 0 634 806 A1 | 6/1994 | (EP) . |
| 2 213 998 | 8/1989 | (GB) . |
| 2 253 949 | 9/1992 | (GB) . |
| 2317993A * | 4/1998 | (GB) . |
| WO 94/19873 * | 9/1994 | (WO) . |
| WO 98/01919 * | 1/1998 | (WO) . |
| WO 98/09342 | 3/1998 | (WO) . |
| WO 98/12772 | 3/1998 | (WO) . |

OTHER PUBLICATIONS

International Search Report, International Application No. PCT/US99/30199, mailed May 30, 2000.*

*Primary Examiner*—William G. Trost
*Assistant Examiner*—Congvan Tran
(74) *Attorney, Agent, or Firm*—Myers Bigel Sibley & Sajovec, P.A.

(57) ABSTRACT

An indirect electrical coupling for a cellular telephone antenna is created by a rotary primary antenna and a stationary paging antenna when the primary antenna is extended into an operative position. When extended, the primary antenna is positioned proximate to the secondary antenna to define an electrical coupling therebetween. Rotating the primary antenna away from the extended position automatically disengages the primary antenna from the telephone operating circuit. The antenna elements or antenna spacings provide the appropriate matching circuitry and the advancement and retraction of the primary antenna provides the switching of the matching circuitry.

38 Claims, 6 Drawing Sheets

U.S. PATENT DOCUMENTS

| | | | | |
|---|---|---|---|---|
| 5,659,888 | | 8/1997 | Kato et al. | 455/475 |
| 5,659,889 | | 8/1997 | Cockson | 455/575 |
| 5,779,496 | | 7/1998 | Bolinger et al. | 439/377 |
| 5,828,343 | | 10/1998 | MacDonald, Jr. et al. | 343/702 |
| 5,838,789 | | 11/1998 | Mendolia | 379/433 |
| 5,907,306 | * | 5/1999 | Karabinis et al. | 343/702 |
| 5,936,587 | | 8/1999 | Gudilev et al. | 343/752 |
| 5,978,655 | | 11/1999 | Ohura et al. | 455/41 |
| 5,995,052 | | 11/1999 | Sadler et al. | 343/702 |
| 6,016,125 | * | 5/1999 | Johansson | 343/702 |
| 6,031,503 | | 2/2000 | Preiss, II et al. | 343/770 |
| 6,043,794 | | 3/2000 | Faulkner et al. | 343/872 |

* cited by examiner

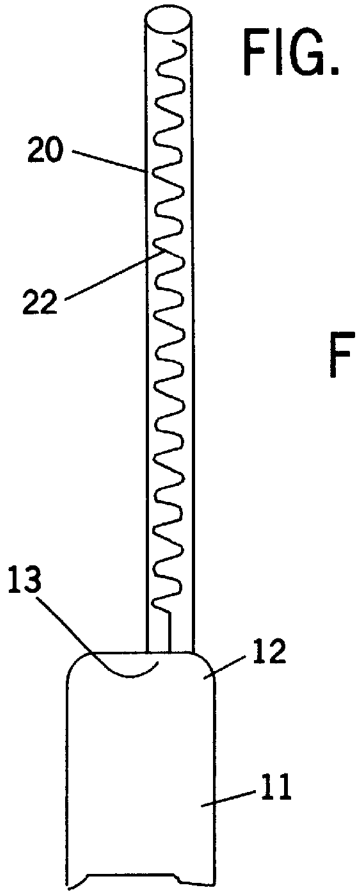
FIG. 7
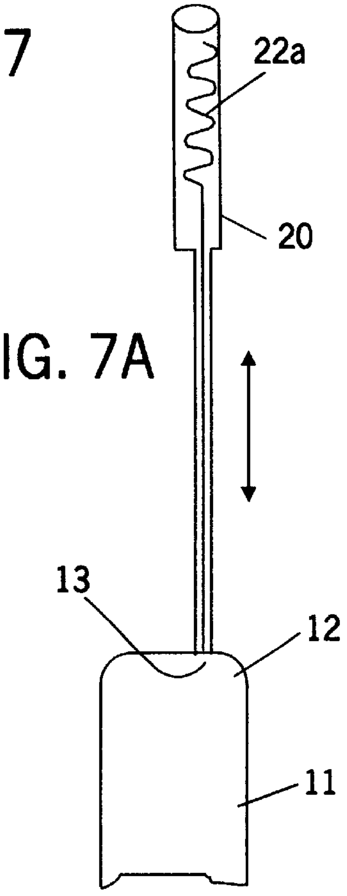
FIG. 7A
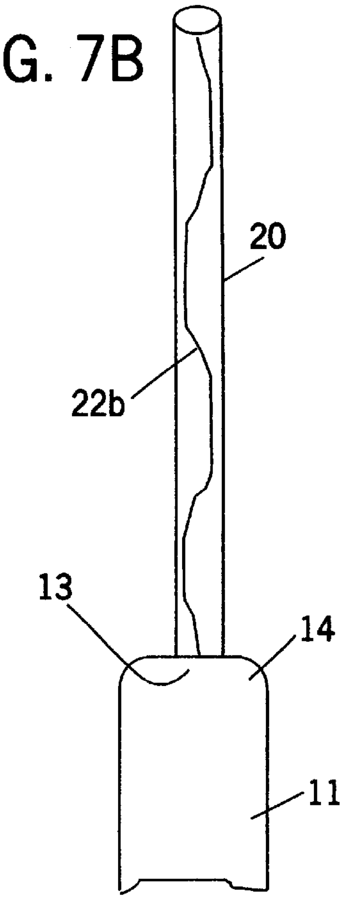
FIG. 7B
FIG. 9
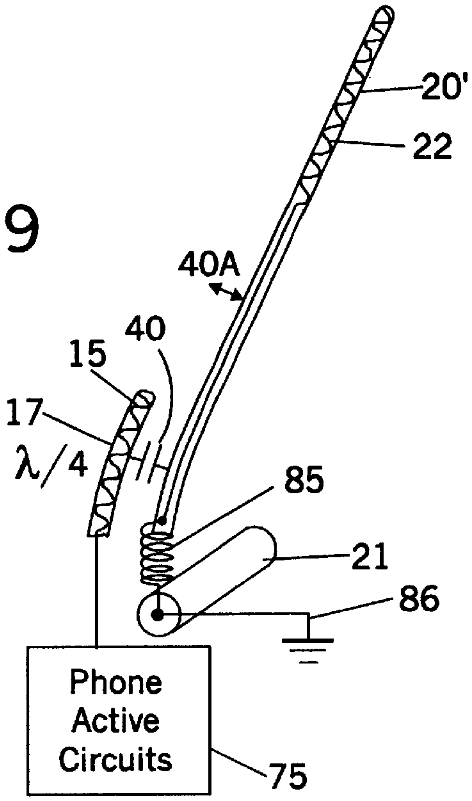

ANTENNA ELECTRICAL COUPLING CONFIGURATIONS

FIELD OF THE INVENTION

The present invention relates generally to antenna couplings and relates more particularly to the coupling of cellular telephone antennas to the internal operating circuitry.

BACKGROUND OF THE INVENTION

Cellular and radiotelephones sometimes include antennas with radiating elements which are extendable away from the radiotelephone body. As such, the antenna is moveable between an extended active use position and a retracted stow position. The stow position is typically defined by the antenna being disposed adjacent the radiotelephone body, while in the active use the antenna is extended above and away from the radiotelephone body to increase signal gain.

In operation, the antenna is configured to connect electrically with telephone operating circuitry that is typically positioned on a printed circuit board inside the radiotelephone body. However, electrically connecting a moveable antenna, especially a pivoting or rotating antenna can be difficult. For example, a rotary type antenna generally requires a direct electrical signal interconnection therethrough. This rotary connection must be designed according to operational considerations which can be especially problematic when attempting to interconnect compact cellular telephone components. Unfortunately, such compact interconnection considerations can result in rotary signal transmission interconnections which are complex, fragile, and can introduce signal losses into the signal path.

Conventionally, rotating connectors have been used to provide an electrical signal line or path engaging the antenna-radiating element with the printed circuit board. Unfortunately, a rotating connector designed to provide the signal path for the antenna can be a relatively complex component and can also be susceptible to performance degradation during use due to its size and operational limitations and its exposure to handling abuses.

In addition, conventional radiotelephones have attempted to provide a paging mode when the antenna is in the stow position. Disadvantageously, the paging mode can be subject to signal interference and the performance in this mode can be less than satisfactory.

OBJECTS AND SUMMARY OF THE INVENTION

In view of the foregoing, it is an object of the present invention to provide a antenna electrical coupling for a pivoting antenna structure which does not require a direct signal path between the antenna and the radiotelephone internal circuitry.

It is another object of the present invention to allow an improved more robust pivoting antenna configuration with improved signal performance and/or improved reliability over conventional radiotelephone models.

It is also an object of the present invention to provide a radiotelephone with improved paging mode performance.

It is still another object of the present invention to provide an improved pivotable flat blade antenna electrical connection for a cellular telephone.

These and other objects are satisfied by the present invention, which is directed to a radiotelephone having an indirect electrical signal path coupling or interconnection which employs spatially separated primary and secondary antenna members. In particular, a first aspect of the present invention is directed toward an antenna coupling assembly which includes a primary antenna member having a first radiating element thereon and a stationary secondary antenna member having a second radiating element thereon. The primary antenna member is configured to pivotably rotate about an axis of rotation from a stow position to an extended position. When the primary antenna is in the extended position, the secondary antenna element is electrically coupled to the primary antenna via an electrical connection between the first and second radiating elements. When the primary antenna is in the stow position, it is separated from the secondary antenna member automatically (electrically) disengages the primary antenna radiating element from the secondary antenna radiating element.

Another aspect of the present invention is directed to radiotelephone comprising a radiotelephone body having a top end portion and a top surface with an electrical operating circuit therein. The telephone also includes a primary antenna pivotably attached to the radiotelephone body such that the primary antenna has a first stow position and a second extended position. The primary antenna rotates about an axis of rotation to longitudinally extend above the top end of the radiotelephone body when in the extended position. The telephone also includes a paging antenna attached to the radiotelephone body and configured to electrically connect to the electrical operating circuit in the radiotelephone body. When the primary antenna is in the second extended position, the paging antenna and the primary antenna are positioned proximate to each other and define an electrical coupling therebetween, thereby connecting the primary antenna to the electrical operating circuit. When the primary antenna is in the first stow position, the primary antenna is electrically disengaged from the paging antenna.

An additional aspect of the present invention is directed to a cellular telephone with a pivoting flexible blade antenna. The telephone comprises a telephone body having opposing first and second ends and a top surface. The telephone also includes a flat blade-paging antenna having a paging-radiating element thereon attached to the telephone body and configured to extend a predetermined distance from the first end of the telephone body. The telephone further includes an operating circuit disposed in the telephone body and electrically connected to the paging antenna and a primary blade antenna having a primary radiating element thereon. The primary blade antenna is configured to pivotably attach to the telephone body such that the primary antenna has a first stow position overlying a portion of the top surface of the telephone body and a second extended position such that the primary antenna longitudinally extends away from the first end of the telephone body. When the primary antenna is in the extended position, the primary antenna is positioned proximate to the paging antenna to define an electrical coupling therebetween such that the paging and primary radiating elements define a half-wave radiating resonator to the operating circuit. When the primary antenna is in the stow position, the primary antenna is electrically disengaged from the paging antenna and the operating circuit. The paging radiating element defines a quarter-wave-radiating resonator to the operating circuit when the primary antenna is stowed. In a preferred embodiment, the primary antenna also includes an inductive component and is continually connected to an electrical ground (or grounding element) in the telephone.

The present invention is advantageous because it allows a more robust mechanical connection between the pivoting antenna and the telephone body by eliminating the direct electrical path dictations generally found in conventional pivoting antenna models. Further, the instant configuration provides improved paging mode performance and does not require a complex electrical path through a rotating connector. Eliminating such a potentially complex component can provide cost advantages as well as performance and reliability improvements and is especially suitable for compact radiotelephones. Also, the configuration of the instant invention enables the radiating elements and the positions of the paging and primary antennas with respect to the other to provide the electrical signal path. Conveniently, the configuration of the instant invention may not require traditional switching of matching networks to facilitate the operation of the radiotelephone in the paging versus operative mode. In addition, the electrical coupling of the instant invention is relatively insensitive to the proximate positions of the two antenna members and defines the matching of the varying antenna loads with respect to the internal circuitry by adjusting the length of the parasitic (radiating) elements and/or the spacing of the two antenna members relative to the other. The switching is easily performed by rotating the primary antenna into and out of the extended position. Alternatively, an inductive component can be positioned on the primary antenna to define an L-C matching network when electrically coupled with the secondary antenna member (i.e., when the primary antenna is extended so as to define a ½ wave-radiating resonator when coupled with the secondary antenna member-radiating element).

BRIEF DESCRIPTION OF THE DRAWINGS

FIGS. 7, 7A, and 7B schematically illustrate preferred primary antenna radiating elements according to the present invention.

FIG. 9 illustrates an additional embodiment of a primary antenna with an inductive component coupled with the paging antenna when in the extended position.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the figures, certain layers, elements, spacings, or regions may be exaggerated for clarity.

In the application, certain terms have been used to describe the positional relationships of certain of the features. As used herein, the term "longitudinal" and derivatives thereof refer to the general direction defined by the longitudinal axis of the radiotelephone that extends between opposing top and bottom ends of the radiotelephone body when held in the hand of a user. As used herein, the terms "outer," "outward," "lateral" and derivatives thereof refer to the direction defined by a vector originating at the longitudinal axis of the radiotelephone and extending horizontally and perpendicularly thereto. Conversely, the terms "inner," "inward," and derivatives thereof refer to the direction opposite that of the outward direction. Together the "inward" and "outward" directions comprise the "transverse" direction.

Figure 1:
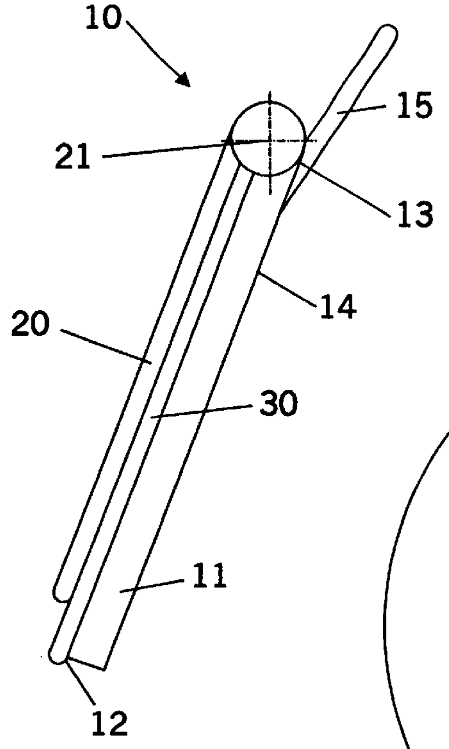
FIG. 1 is a side view of a cellular or radiotelephone having a paging antenna and a swivel primary antenna according to one embodiment of the present invention.

A preferred embodiment of the instant invention is shown in FIG. 1. As shown, a cellular telephone 10 comprises a telephone body 11, a paging (or secondary) antenna 15, and a primary antenna 20. Preferably, the primary antenna 20 is configured to pivotably attach to the telephone body 11 via a hinging mechanism or structure 21. FIG. 1 illustrates the cellular telephone 10 in a "paging mode," wherein the paging antenna is the "live" or operative antenna when the primary antenna 20 is in the stow position (i.e., a position different from the active or talking use position of the antenna). Preferably, as illustrated, the primary antenna 20 overlays a portion of the top surface 12 of the telephone in the stow position.

Figure 2:
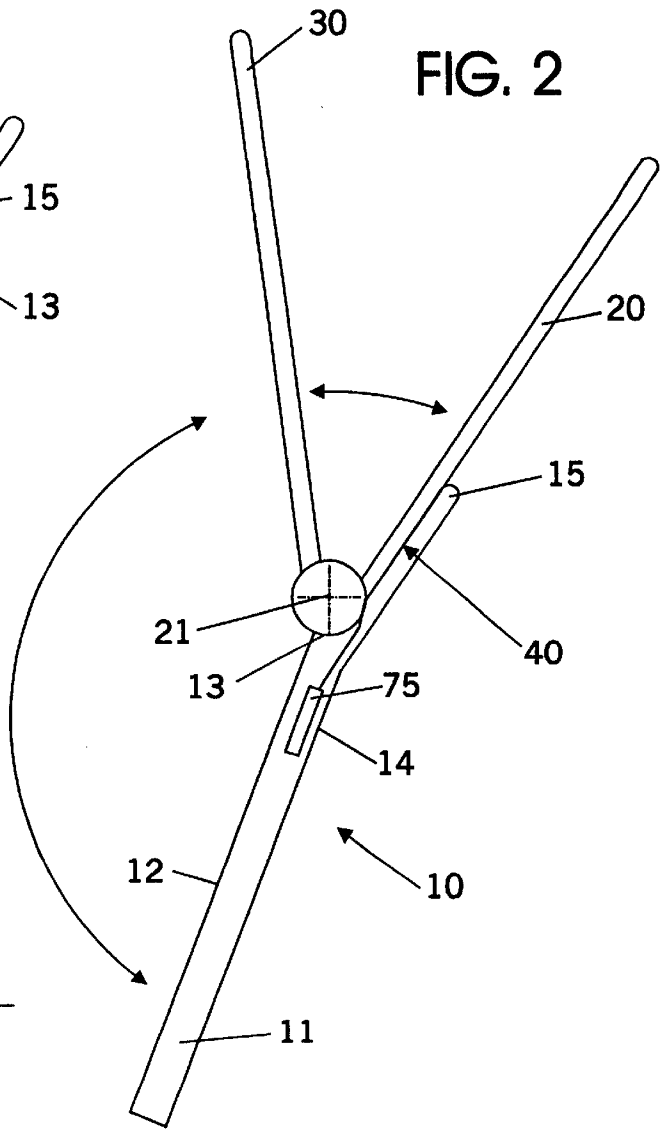
FIG. 2 illustrates the telephone of FIG. 1 with the primary antenna in an extended position and the primary and paging antennas proximately positioned.

Referring now to FIGS. 1 and 2, in a preferred embodiment the cellular telephone 10 is a low-profile unit which includes a flexible strip conductive trace ("a flat blade antenna") as the primary antenna. The telephone also preferably includes a "flip" cover member 30 housing certain components such as a speaker (not shown). Preferably, as shown in FIG. 1, during paging mode or non-talking use, the primary antenna 20 is configured so that it folds over and is stowed adjacent the flip member 30 such that both the primary antenna 20 and flip 30 overlay the top surface 12 of the telephone housing or body 11 when each are in the stow position.

In operation, in one embodiment, as shown in FIG. 2, the primary antenna 20 rotates through an axis of rotation "A" which extends into the paper through the cross-point shown (transversely across the end of the telephone) and is defined by the pivot attachment structure 21 to advance into a preferred operative position (i.e., an extended position). Additional details describing blade antennas 20, flips 30, and preferred mounting structures are disclosed in co-pending and co-assigned patent applications entitled Flat Blade Antenna and Flip Mounting Structures and Flat Blade Antenna and Flip Engagement and Hinge Configurations, identified by U.S. patent application Ser. Nos. 09/217,048 and 09/217,142, respectively. The contents of these disclosures are hereby incorporated by reference as if recited in full herein.

Referring again to FIG. 2, the primary antenna 20 preferably rotates through about 180–210 degrees from the closed or stow position to advance toward the paging antenna 15 in a preferred operative or extended position. In contrast, the flip cover 30 rotates to an open position which is less than the angular advancement of the primary antenna 20, advantageously positioning both of the antennas away from the user during active telephone mode ("talk mode" ) operation. As shown in FIGS. 1 and 2, the paging antenna 15 is attached to the back side 14 of the telephone body such that it is stationary and fixed relative thereto. Also, the paging antenna extends longitudinally above the top end 13 of the telephone body about at least 20 mm for operatively preferred reception during the paging mode.

In any event, as shown in FIGS. 2, 5, 6, 6A, 6B, and 9, when in the extended position, the primary antenna 20 is proximately positioned relative to the paging antenna 15 so as to create an electrical coupling 40 therebetween. Preferred relative positions of the antennas will be discussed further below.

Figure 3:
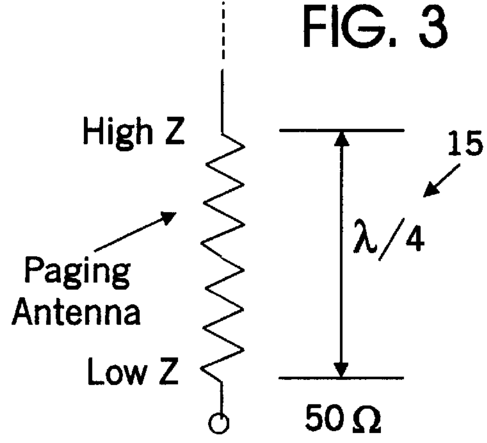
FIG. 3 is schematic representation of a paging antenna according to the present invention.

FIG. 3 illustrates an electrical schematic of a preferred paging antenna 15 according to the instant invention. The paging antenna 15 is configured such that it is electrically connected to the telephone operating circuitry 75 (FIGS. 2 and 9) disposed inside the telephone body. Generally stated, the operating circuitry 75 is typically mounted on a printed circuit board (not shown). As shown in FIGS. 8, 8A, 8B, and 8C, the paging antenna 15 includes a radiating element 17, 17*a*, 17*b*, 17*c*, which defines a ¼ wave load (i.e., resonator) to the electrical signal input 45 (FIG. 4) when the primary antenna 20 is not extended. Preferably, during the paging mode, the paging antenna element 17 is configured to provide a 50 Ohm signal input 45 (FIG. 4).

Figure 4:
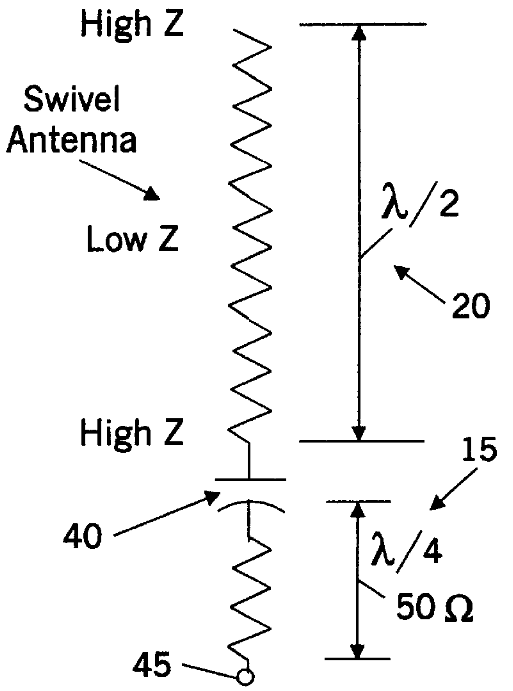
FIG. 4 is a schematic representation of the paging and primary antennas illustrating the electrical coupling of proximately positioned antennas according to the present invention.

In contrast, as shown in FIG. 4, the primary antenna 20 includes a radiating element 22 (FIG. 7) which is configured to provide a ½ wave load. By rotating the primary antenna 20 out of the active or extended position toward the stow position (or into the stow position), the primary antenna 20 is (automatically) electrically decoupled or disengaged from the secondary antenna 15 (and the operating circuit). Advantageously, such an automatic disconnection helps operating performance of the telephone in the paging mode and removes the necessity for additional components associated with matching and switching networks typically associated with antennas with varying impedance loads. Preferably, the matching is achieved by adjusting the length of the parasitic radiating element 22 of the primary antenna 20 and/or by adjusting the gap 40 spacing defined by the extended position of the primary antenna 20 relative to the secondary or paging antenna 15.

When extended, the primary antenna 20 is automatically electrically coupled to the paging antenna 15, thereby defining an extended electrical signal path extending from the top of the primary radiating element 22 through the coupling 40 and the paging antenna element 17 to the signal input 45 (FIG. 4) and the operating circuitry 75. As shown in FIG. 4, the electrical coupling 40 is a capacitive coupling. Thus, when the primary antenna and secondary or paging antenna elements are electrically coupled, the antennas 15, 20 combine to define a ½ wave resonator load to the signal input 45 (preferably with a 50 Ω input) into the operating circuitry of the telephone.

Figure 5:
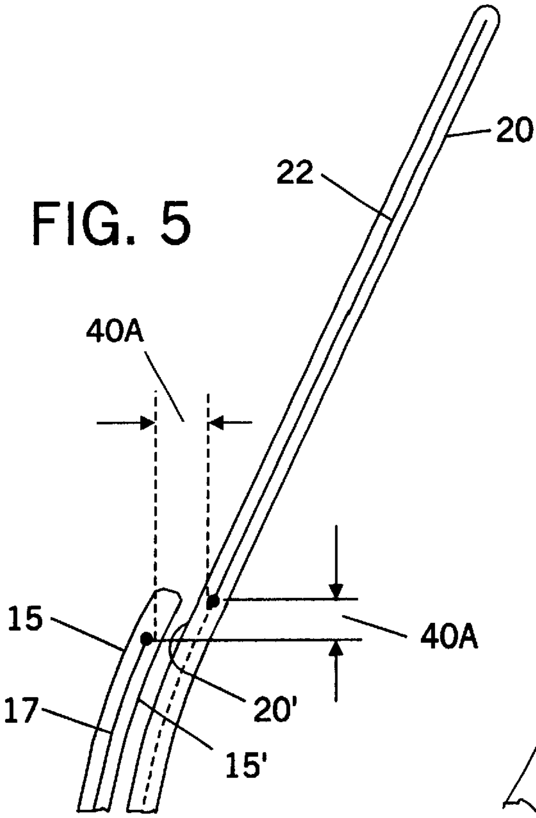
FIG. 5 is a side view of a telephone illustrating a preferred gap spacing for the electrical coupling defined by the relative positions of the paging antenna and primary antenna (when extended) according to a preferred embodiment of the present invention.

The term "proximate," as used herein, includes positioning the primary and paging antennas 20, 15 with their radiating elements positioned so as to be adjacent to each other in a manner in which the spacing is sufficient to provide an electrical coupling (e.g., a capacitive coupling) therebetween. Typically, this electrical coupling is provided as an air gap 40A between the paging antenna and primary radiating elements 17, 22. FIGS. 5 and 9 show examples of a non-contacting antenna embodiments with an electrical (capacitive coupling). Preferably, the gap 40 is about 2–3 mm and configured to provide about a 6–8 picofarad capacitance value. Alternatively, the primary and secondary antennas 20, 15 may contact. For example, as shown in FIG. 2, the primary antenna 20 contacts the nonconducting substrate material of the secondary antenna 15. Referring to FIG. 5, the primary and paging antennas 20, 15 can be configured such that instead of the transverse gap 40A shown, the outside of the antenna bodies 20', 15' physically contact, but the respective conducting radiating elements 22, 17 are separated by a transverse gap distance (and or longitudinal distance) defining the capacitive coupling 40 therebetween. The outside of the antenna bodies 20', 15' are typically formed of non-conducting substrate materials.

Figure 8C:
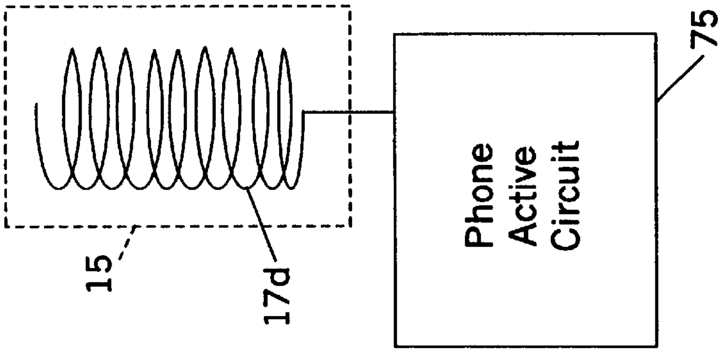
FIGS. 8, 8A, 8B and 8C schematically illustrate preferred paging antenna radiating elements according to the present invention.
Figure 8B:
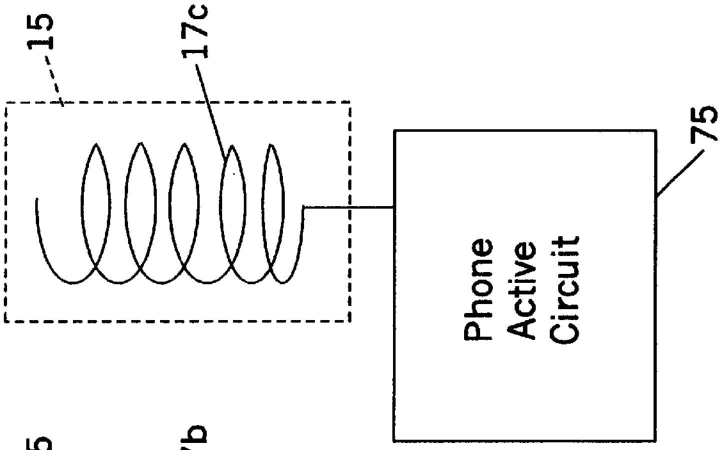
Figure 8A:
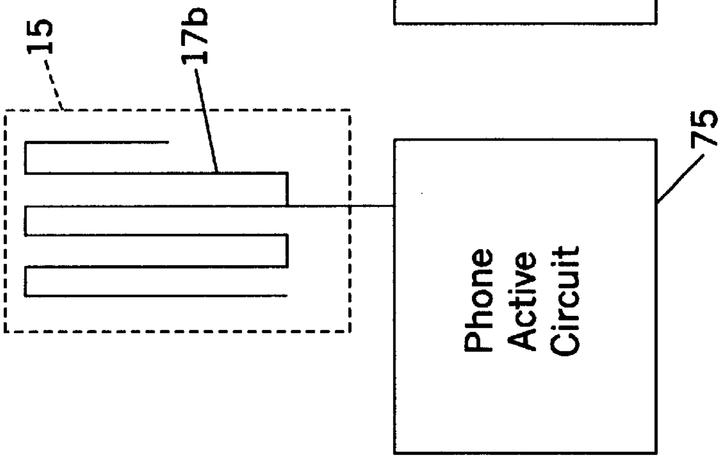
Figure 8:
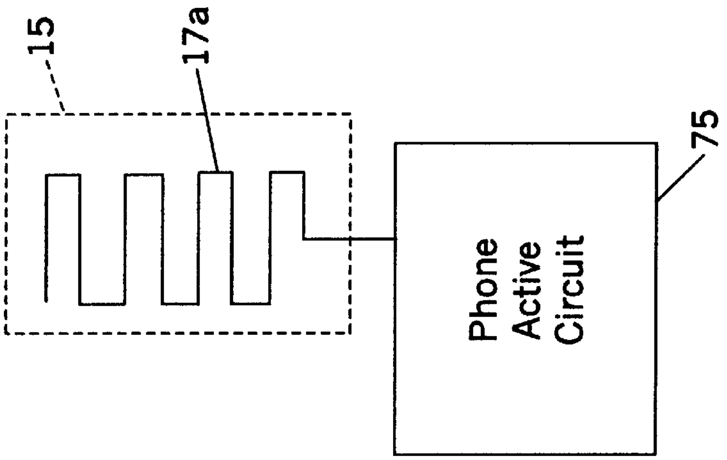

In any event, as the antennas 15, 20 separate more than about 8–10 mm, the primary antenna 20 is electrically decoupled from the secondary antenna 15 (and preferably the operating circuit (FIG. 8, 75).

As shown in FIG. 5, the primary radiator element 22 may extend below (shown in dotted line) or terminate on the antenna 20 such that the radiator pattern initiates above the paging antenna radiating element 17 when the primary antenna 20 is extended.

Figure 6:
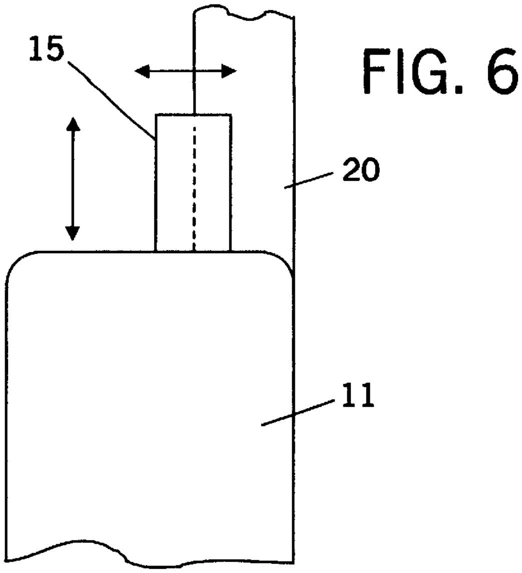
FIGS. 6, 6A, and 6B illustrate alternate positions of the extended primary antenna relative to the paging antenna according to the present invention.
Figure 6A:
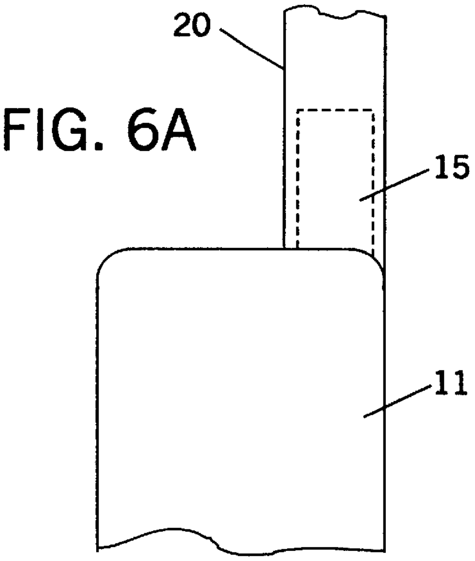

In a preferred embodiment, as shown in FIG. 6A, the primary antenna 20 is aligned with the paging antenna 15 such that it substantially overlays the paging antenna 15. Advantageously, the antenna coupling of the instant invention is substantially insensitive to misalignment and can operate without significant signal performance degradation even when the position of the primary antenna 20 changes over time (i.e., becomes misaligned from its original position). This insensitivity to exact physical location is particularly advantageous when using flexible traces, which have a tendency to change in shape or position due to their inherent flexibility and susceptibility to wear during use of the flexible antenna 20 in the telephone over time.

Figure 6B:
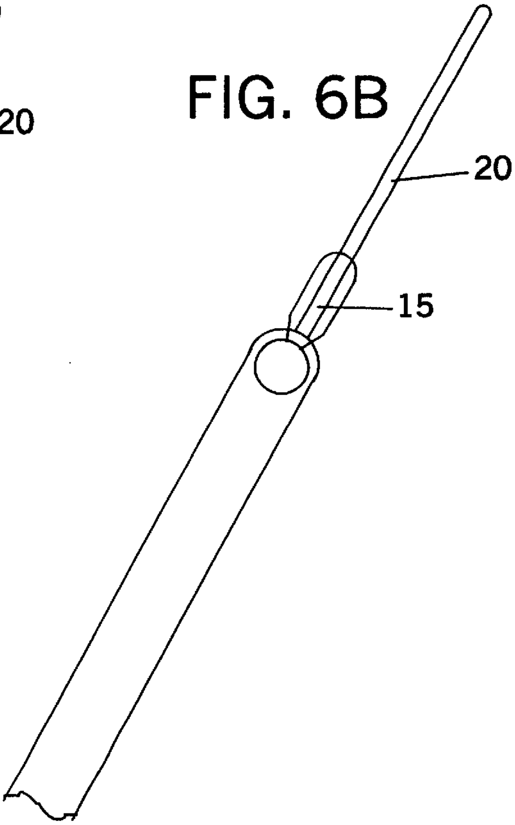

FIG. 6 illustrates an additional coupling position according to the instant invention. As shown, the paging antenna 15 is serially aligned (back to back) such that it overlays a portion of the primary antenna 20 but is transversely offset relative thereto. FIG. 6B illustrates another alternative antenna mounting configuration which utilizes a side mounted paging antenna 15 and a pivotable primary antenna 20.

FIG. 7 illustrates an additional alternative embodiment of a side mounted pivoting primary antenna 20 with a radiating element 22 which extends substantially the length of the primary antenna 20. Of course, the primary antenna 20 can also be mounted such that it is longitudinally translatable or retractable (FIG. 7A), pivotably front mounted, or otherwise mounted to be retractable about the radiotelephone body. For example, a primary antenna 20 (pivotable or rotating or otherwise extendable) can be mounted toward or on a back surface of the housing while the paging antenna is mounted on a side or front edge portion. This can allow the primary antenna 20 to be positioned further away from the user during the talking mode when the antenna is extended helping improve signal quality.

In addition, the radiating element 22 can be configured in numerous suitable ways to provide the desired load as will be appreciated by those of skill in the art. For example, the primary radiating element 22 can be configured as one of or a combination of a rod 22B (FIG. 7B), a top loaded whip or helix (FIG. 7A), a helix or compressed helix, branch double resonance pattern (such as shown for the paging antenna in FIG. 8A or other meander pattern (FIG. 7).

Similarly, the paging antenna 15 includes a radiating element 17 which can be configured in a number of suitable ways (such as one or combinations of those described for the primary antenna above although the top loaded helix is not preferred for the paging antenna element 17) to provide the desired load for the paging mode. For example, as shown in FIG. 8, the element is a meander pattern 17*a*. FIG. 8A illustrates the element as a branch double resonance pattern 17*b*, FIG. 8B illustrates a helix element 17*c*, and FIG. 8C shows a compressed helix element 17*d*.

In an alternative preferred embodiment as shown in FIG. 9, the primary antenna 20' includes an inductive component 85 thereon. The primary antenna is operatively associated with an electrical ground (element) 86. Preferably, the inductive component 85 is configured to provide about 8 nanohenrys of inductance. As shown, the inductive component 85 is positioned at a lower end portion of the primary antenna and is connected in series with the capacitive coupling 40 defined by the spacing between the secondary 15 and primary antenna 20' when the primary antenna 20' is extended. Hence, this configuration provides an L-C network for the ½ wave element when the primary antenna 20' is extended. The capacitive coupling 40 interconnects the operating circuitry 75 of the telephone. As such, the inductive component and the capacitor 40 (as well as the primary radiating element load) are electrically disengaged from the operating circuitry 75 automatically simply by rotating the primary antenna 20' away from the active or extended position. The ground (element) 86 is preferably constantly engaged with the primary antenna such as through the pivot structure 21 allowing good tuning and performance improvements for the telephone, while providing a high level of mechanical reliability and robustness.

Advantageously, the instant invention allows a relatively wide operating bandwidth from about 15% to 50% of the operating frequency. The preferred ½ wave and ¼ wave loads described herein are generally used at about 800 MHz but the instant invention is not limited thereto.

Figure 10A:
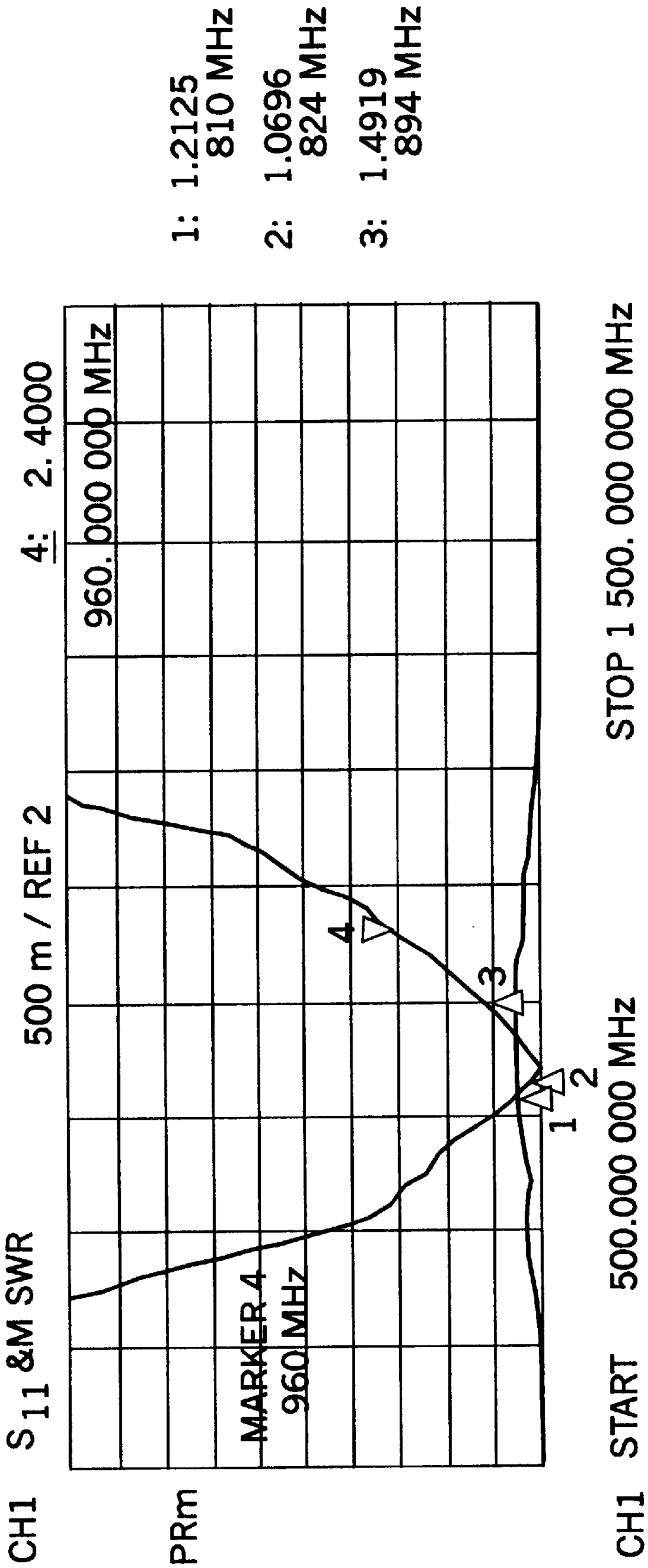
FIG. 10A is a VSWR plot of a paging antenna coupled to a primary antenna in the extended position according to the present invention at a low band (800 MHz).
Figure 10B:
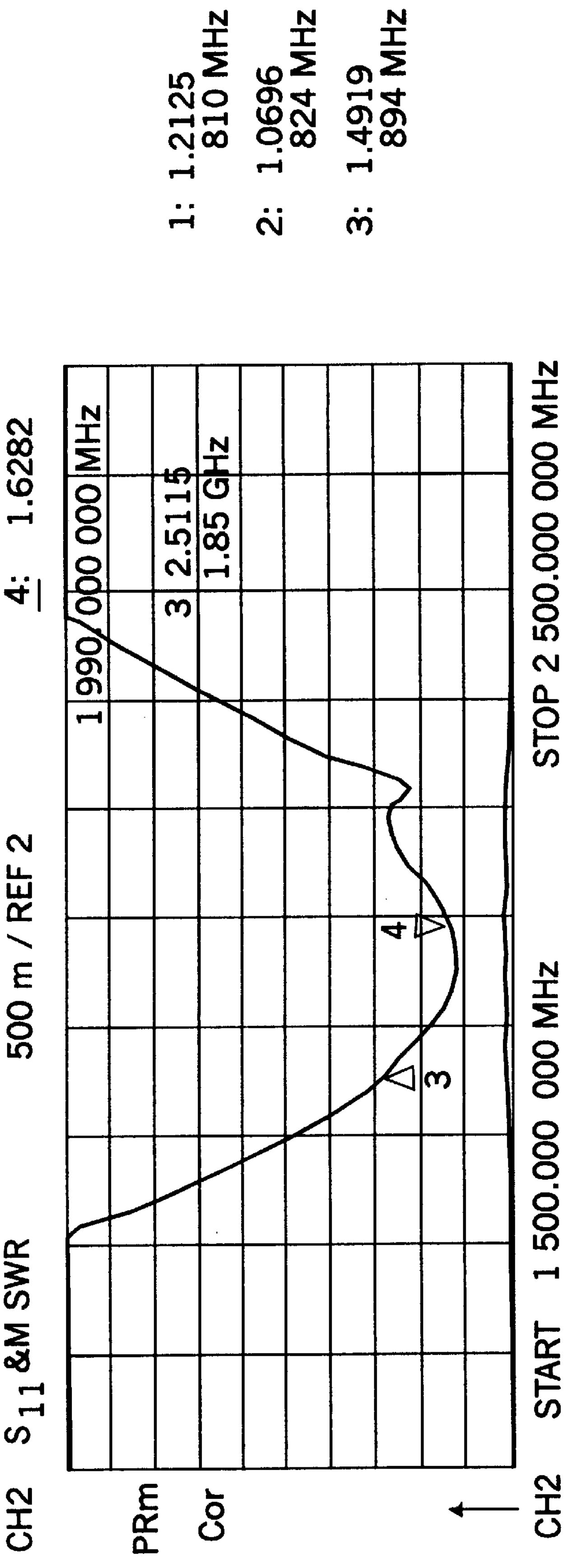
FIG. 10B is a VSWR plot of an electrically coupled paging and primary antenna in the extended position according to the present invention at a high band (1900 MHz).

FIGS. 10A and 10B are VSWR plots of data corresponding to a capacitively coupled primary and secondary antenna 15, 20 in the extended position according to the present invention. As shown, the antenna load is matched at the frequencies of interest. FIGS. 10A and 10B represent an exemplary dual band configuration (800 MHz and 1900 MHz respectively).

The present invention does not require direct electrical signal paths through rotating connectors and now enables antenna pivots to be designed without regard to direct electrical signal paths therein. Further, the instant antenna couplings do not require separate switching and matching networks and can be cost effective over conventional models and is relatively insensitive to relative positional changes between the primary and paging antennas. In addition, the indirect coupling can improve signal performance and/or decrease signal losses over that of typical rotary antenna configurations and can improve paging mode performance.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed. and that modifications to the disclosed embodiments, as well as other embodiments, are intended to be included within the scope of the appended claims. The invention is defined by the following claims, with equivalents of the claims to be included therein.

That which is claimed is:

1. An indirect antenna coupling assembly, comprising:

a first antenna member having a first radiating element thereon, said first antenna member configured to pivotably rotate about an axis of rotation from a stow position to an extended position; and a second antenna member having a second radiating element thereon, wherein when said first antenna member is in said extended position, said first radiating element and said second radiating element are spatially separated with a gap therebetween, said gap defining an indirect electrical coupling between said first radiating element and said second radiating element, and wherein when said first antenna member is in said stow position, said first radiating element and said second radiating element are sufficiently spatially separated to electrically decouple said first and second radiating elements.

2. An indirect antenna coupling according to claim 1, wherein said first antenna member comprises an inductive element and is configured to be operatively associated with an electrical ground element.

3. An indirect antenna coupling according to claim 1, wherein said first radiating element is configured to define a ½ wave resonator, and wherein said first radiating element is arranged on said first antenna member as at least one of a rod, meander, helix, compressed helix, top loaded helix, and branch double resonance pattern.

4. An indirect antenna coupling assembly according to claim 3, wherein when said first antenna member is spatially separated from said second antenna member in said extended position, said first and second radiating elements together define about a ½ wave-radiating resonator.

5. An indirect antenna coupling according to claim 3, wherein said second antenna member is a paging antenna, and wherein said second antenna member is positioned behind said first antenna member when said first antenna member is in said extended position.

6. An indirect antenna coupling assembly according to claim 1, wherein said second radiating element defines a ¼ wave resonator, and wherein said second radiating element is arranged on said second antenna member as at least one of a rod, helix, compressed helix, branch double resonance and a meander pattern.

7. An indirect antenna coupling according to claim 1, wherein said first antenna member is rotatably extendable about an axis of rotation, and wherein said first antenna member rotates through about at least 180 degrees from said stow position to said extended position to advance into a preferred operative position and to indirectly electrically engage with said second antenna member.

8. An indirect antenna coupling according to claim 1, wherein said first antenna member and said second antenna member are spatially separated with a gap therebetween when said first antenna is in said extended position.

9. An indirect antenna coupling according to claim 1, further comprising a telephone body having opposing first and second ends, wherein said second antenna extends at least 20 millimeters above said first end of said telephone body, wherein said second antenna is a paging antenna operative when said first and second antennas are electrically decoupled, and wherein said first and second antenna bodies physically contact while said respective antenna radiating elements are spatially separated in the extended position.

10. An indirect antenna coupling according to claim 9, wherein said second antenna extends in a longitudinal direction that is angularly oriented away from a user when said telephone body is held in an operational position adjacent the head of the user.

11. An indirect antenna coupling according to claim 1, wherein said gap between said radiating elements is about 2–3 millimeters.

12. An indirect antenna coupling according to claim 1, wherein said gap between said radiating elements is configured to provide about a 6–8-picofarad capacitance value.

13. An indirect antenna coupling according to claim 1, wherein said gap between said radiating elements is provided as an air gap.

14. An indirect antenna coupling assembly comprising:

a first antenna member having a first radiating clement thereon, said first antenna member configured to pivotably rotate about an axis of rotation from a stow position to an extended position; and a second antenna member having a second radiating element thereon, wherein when said first antenna member is in said extended position, said first radiating element and said second radiating element are spatially separated with a gap therebetween, said gap defining an indirect electrical coupling between said first radiating element and said second radiating element, and wherein when said first antenna member is in said stow position, said first radiating element and said second radiating element are sufficiently spatially separated to electrically decouple said first and second radiating elements, wherein said first antenna member is rotatable extendable about an axis of rotation, and wherein said first antenna member rotates through about at least 180 degrees from said stow position to said extended position to advance into a preferred operative position and to indirectly electrically engage with said second antenna member, and wherein said first antenna member is configured as a flexible conductive trace antenna, and wherein said first antenna member rotates to contact said second antenna member in said extended position.

15. A radiotelephone, comprising:

a radiotelephone body having a top end portion and a top surface and comprising an electrical operating circuit therein;

a first antenna pivotably attached to said radiotelephone body such that said first antenna has a first stow position and a second extended position, wherein said first antenna rotates about an axis of rotation to longitudinally extend away from said radiotelephone body top end portion in said second extended position; and a second antenna attached to said radiotelephone body and configured to electrically connect to said electrical operating circuit in said radiotelephone body;

wherein when said first antenna is in said second extended position, said first antenna and said second antenna are spatially separated with a gap therebetween, said gap defining an indirect electrical coupling between said first antenna and said second antenna, and wherein when said first antenna is in said first stow position, said first antenna and said second antenna are sufficiently spatially separated to electrically decouple said first and second antennae.

16. A radiotelephone according to claim 15, wherein said first antenna is electrically decoupled from said second antenna and said operating circuit when in said first stow position.

17. A radiotelephone according to claim 15, further comprising an electrical ground element operatively associated with said radiotelephone, wherein said first antenna comprises an inductive element and is electrically connected to said electrical ground element.

18. A radiotelephone according to claim 17, wherein said indirect electrical coupling is an indirect capacitive coupling, and wherein when said first antenna is extended, said second antenna and said first antenna are spatially separated to define a capacitive coupling therebetween, and wherein when said first antenna is extended, said first and second antennae define an L-C series matching circuit operatively associated with said radiotelephone electrical operating circuit in said radiotelephone body.

19. A radiotelephone according to claim 15, wherein when said first antenna is in said first stow position, said second antenna defines a ¼ wave radiating element operatively associated with said operating circuit, and when said first antenna is extended, said first antenna and said second antenna electrically engage to define a ½ wave radiating element operatively associated with said operating circuit, and wherein said second antenna is a paging antenna operative when said first and second antennas are electrically decoupled.

20. A radiotelephone according to claim 9, wherein said second antenna extends at least 20 millimeters above said radiotelephone body top end portion.

21. A radiotelephone according to claim 15, wherein said second antenna extends in a longitudinal direction that is angularly oriented away from a user when said radiotelephone is held in an operational position adjacent the head of the user.

22. A radiotelephone according to claim 15, wherein said gap between said antennae is about 2–3 millimeters.

23. A radiotelephone according to claim 15, wherein said gap between said antennae is configured to provide about a 6–8 picofarad capacitance value.

24. A radiotelephone according to claim 15, wherein said gap between said antennae is provided as an air gap.

25. A cellular telephone, comprising:

a telephone body having opposing first and second ends and a top surface;

a flat blade paging antenna having a paging radiating element thereon attached to said telephone body and configured to extend a predetermined distance away from the first end of said telephone body;

an operating circuit disposed in said telephone body electrically connected to said paging antenna; and a primary blade antenna having a primary radiating element thereon, said primary blade antenna configured to pivotably attach to said telephone body such that said primary antenna has a first stow position overlying a portion of said top surface of said telephone body and a second extended position such that said primary antenna longitudinally extends away from said first end of said telephone body, wherein when said primary antenna is in said second extended position, said primary radiating element and said paging radiating element are spatially separated with a gap therebetween, said gap defining an indirect electrical coupling between said primary radiating element and said paging radiating element such that said primary radiating element and said paging radiating element provide a half-wave radiating resonator to said operating circuit, and wherein when said primary antenna is in said first stow position, said primary radiating element and said paging radiating element are sufficiently spatially separated to disengage said indirect electrical coupling between said primary radiating element and said paging radiating element, such that said paging radiating element presents a quarter-wave radiating resonator to said operating circuit.

26. A cellular telephone according to claim 25, wherein said paging antenna is fixed to a rear surface of said telephone body, and wherein, when in said second extended position, said primary antenna is positioned such that it is separate from and overlays at least a portion of said paging antenna to define a separation gap therebetween.

27. A cellular telephone according to claim 26, wherein said primary antenna rotates through an angle of greater than about 180 degrees from said first stow position to said second extended position.

28. A cellular telephone according to claim 25, further comprising an electrical ground element operatively associated with said telephone, wherein said primary antenna comprises an inductive element and is electrically connected to said electrical ground element.

29. A cellular telephone according to claim 28, wherein said electrical coupling is an indirect capacitive coupling, and wherein, when in said second extended position, said primary antenna inductor element is connected in series with said indirect capacitive coupling, thereby defining a series L-C matching circuit.

30. A cellular telephone according to claim 25, wherein said paging antenna extends at least 20 millimeters above said first end of said telephone body.

31. A cellular telephone according to claim 25, wherein said primary antenna rotates through about 180–210 degrees as it travels into said extended position, and wherein said primary antenna longitudinally extends in a direction that is angularly oriented away from a user when said cellular telephone is held in an operational position adjacent the head of the user.

32. A cellular telephone according to claim 25, wherein said paging antenna extends in a longitudinal direction that is angularly oriented away from a user when said cellular telephone is held in an operational position adjacent the head of the user.

33. A cellular telephone according to claim 25, wherein said gap between said radiating elements is about 2–3 millimeters.

34. A cellular telephone according to claim 25, wherein said gap between said radiating elements is configured to provide about a 6–8 picofarad capacitance value.

35. A cellular telephone according to claim 25, wherein said gap between said radiating elements is provided as an air gap.

36. A cellular telephone according to claim 25, wherein when said antennae separate by more than about 8–10 millimeters, said radiating elements are sufficiently spatially separated to disengage said indirect electrical coupling.

37. An indirect antenna coupling assembly comprising:

a first antenna member having a first radiating element thereon, said first antenna member configured to pivotably rotate about an axis of rotation from a stow position to an extended position; and a second antenna member having a second radiating element thereon, wherein when said first antenna member is in said extended position, said first radiating element and said second radiating element are spatially separated with a gap therebetween, said gap defining an indirect electrical coupling between said first radiating element and said second radiating element, and wherein when said first antenna member is in said stow position, said first radiating element and said second radiating element are sufficiently spatially separated to electrically decouple said first and second radiating elements, wherein said first antenna rotates through about 180–210 degrees as it travels into said extended position, and wherein said first antenna longitudinally extends in a direction that is angularly oriented away from a user when said telephone body is held in an operational position adjacent the head of the user.

38. A radiotelephone comprising:

a radiotelephone body having a top end portion and a top surface and comprising an electrical operating circuit therein;

a first antenna pivotably attached to said radiotelephone body such that said first antenna has a first stow position and a second extended position, wherein said first antenna rotates about an axis of rotation to longitudinally extend away from said radiotelephone body top end portion in said second extended position; and a second antenna attached to said radiotelephone body and configured to electrically connect to said electrical operating circuit in said radiotelephone body, wherein when said first antenna is in said second extended position, said first antenna and said second antenna are spatially separated with a gap therebetween, said gap defining an indirect electrical coupling between said first antenna and said second antenna, and wherein when said first antenna is in said first stow position, said first antenna and said second antenna are sufficiently spatially separated to electrically decouple said first and second antennae, wherein said first antenna rotates through about 180–210 degrees as it travels into said extended position, and wherein said first antenna longitudinally extends in a direction that is angularly oriented away from a user when said radiotelephone is held in an operational position adjacent the head of the user.

* * * * *